United States Patent
Haag et al.

(10) Patent No.: US 10,815,405 B2
(45) Date of Patent: Oct. 27, 2020

(54) ONE-COMPONENT EPOXY-MODIFIED POLYURETHANE AND/OR POLYUREA ADHESIVES HAVING HIGH ELONGATION AND EXCELLENT THERMAL STABILITY, AND ASSEMBLY PROCESSES USING SAME

(71) Applicant: Dow Global Technologies LLC, Midland, MI (US)

(72) Inventors: Benjamin Haag, Horgen (CH); Andreas Lutz, Altendorf (CH); Cathy Grossnickel, Wolfhausen (CH); Raymond F. Bis, Ortonville, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 26 days.

(21) Appl. No.: 16/064,578

(22) PCT Filed: Jan. 9, 2017

(86) PCT No.: PCT/US2017/012762
§ 371 (c)(1),
(2) Date: Jun. 21, 2018

(87) PCT Pub. No.: WO2017/127253
PCT Pub. Date: Jul. 27, 2017

(65) Prior Publication Data
US 2019/0010373 A1    Jan. 10, 2019

Related U.S. Application Data

(60) Provisional application No. 62/280,587, filed on Jan. 19, 2016.

(51) Int. Cl.
| | | |
|---|---|---|
| C09J 5/06 | (2006.01) |
| C09J 163/00 | (2006.01) |
| C09J 175/00 | (2006.01) |
| C08G 59/20 | (2006.01) |
| C08G 59/24 | (2006.01) |
| C08G 59/40 | (2006.01) |
| C08G 59/68 | (2006.01) |
| C09J 175/08 | (2006.01) |
| C08G 18/10 | (2006.01) |
| C08G 18/20 | (2006.01) |
| C08G 59/10 | (2006.01) |
| C08G 59/04 | (2006.01) |
| C08G 18/32 | (2006.01) |
| C08G 59/06 | (2006.01) |
| B32B 27/38 | (2006.01) |
| C08G 65/333 | (2006.01) |

(52) U.S. Cl.
CPC ............ *C09J 175/08* (2013.01); *C08G 18/10* (2013.01); *C08G 18/2027* (2013.01); *C08G 18/3275* (2013.01); *C08G 59/04* (2013.01); *C08G 59/06* (2013.01); *C08G 59/10* (2013.01); *C08G 59/4021* (2013.01); *C08G 59/686* (2013.01); *C09J 163/00* (2013.01); *C08G 65/33348* (2013.01)

(58) Field of Classification Search
None
See application file for complete search history.

(56) References Cited

U.S. PATENT DOCUMENTS

| | | | | |
|---|---|---|---|---|
| 4,977,201 A * | 12/1990 | Ogawa | ................... | C08L 27/06 523/400 |
| 2004/0131839 A1* | 7/2004 | Eagle | ..................... | B32B 15/08 428/317.1 |
| 2008/0251203 A1 | 10/2008 | Lutz | | |
| 2010/0009196 A1 | 1/2010 | Kramer | | |
| 2011/0126981 A1* | 6/2011 | Lutz | .................. | C08G 18/6715 156/330 |
| 2015/0001281 A1* | 1/2015 | Jialanella | ........... | C08G 18/8012 228/175 |

FOREIGN PATENT DOCUMENTS

| | | | | |
|---|---|---|---|---|
| EP | 1916270 A | 4/2008 | | |
| JP | 63243123 A * | 10/1988 | ............. | C08G 18/58 |

OTHER PUBLICATIONS

Machine translation of JP-63243123-A (no date).*

* cited by examiner

Primary Examiner — Michael J Feely
(74) Attorney, Agent, or Firm — Hong Xu

(57) ABSTRACT

A one-component epoxy-modified polyurethane and/or urea adhesive includes very high levels of reactive urethane group- and/or urea group-containing tougheners, an epoxy resin and epoxy hardener. These adhesives are formulated to cure at high temperatures and surprisingly provide high elongations, excellent thermal stability and good adhesive properties.

11 Claims, No Drawings

ONE-COMPONENT EPOXY-MODIFIED POLYURETHANE AND/OR POLYUREA ADHESIVES HAVING HIGH ELONGATION AND EXCELLENT THERMAL STABILITY, AND ASSEMBLY PROCESSES USING SAME

This invention relates to one-component, epoxy-modified polyurethane adhesives and assembly processes that make use of those adhesives.

During the assembly of automotive vehicles, coatings are frequently applied by dipping a partially- or entirely assembled body frame into a coating bath and then baking the coated assembly to cure the coating material. The baking step exposes the body frame to temperatures that are nominally about 160°. However, significant temperature gradients exist in the oven. Upper regions of the oven, for example, tend to be significantly hotter than other areas. Localized temperatures within the oven may reach 180-210° C.

In the past, automotive body structures were made entirely or almost entirely of steel parts, that were fastened together mainly by welding. Recently, the industry has turned to structural adhesives to reduce the number of welds, or to eliminate welding altogether. These structural adhesives often are toughened one-component epoxy types. These are latent adhesives that require high temperatures to cure. When cured, these adhesives demonstrate strong adhesion to metal surfaces, even when those surfaces are oily when the adhesive is applied, and the adhesive bonds they form when cured have very high dynamic peel resistance. The epoxy adhesive can be cured simultaneously with the coating. Because these toughened epoxy adhesives are quite heat-resistant, they can withstand the temperature of the bake curing step.

The toughened epoxy adhesives are formulated to include "tougheners" that help the cured adhesive resist failure in crash situations. The tougheners have blocked isocyanate groups that, under the conditions of the curing reaction, can become de-blocked and react with an epoxy resin. Tougheners of this type are described, for example, in U.S. Pat. Nos. 5,202,390, 5,278,257, WO 2005/118734, WO 2007/003650, WO2012/091842, U. S. Published Patent Application No. 2005/0070634, U. S. Published Patent Application No. 2005/0209401, U. S. Published Patent Application 2006/0276601, EP-A-0 308 664, EP 1 498 441A, EP-A 1 728 825, EP-A 1 896 517, EP-A 1 916 269, EP-A 1 916 270, EP-A 1 916 272 and EP-A-1 916 285.

Another trend in the automotive industry is a move towards alternative materials of construction. Steel parts are being replaced with other materials that are lighter in weight and/or provide enhanced design capabilities or aesthetic features. Modern vehicle bodies often are made from parts that are made of two or more different materials.

Joining disparate materials places even greater emphasis on the development of suitable adhesives, as welding may not be possible and the use of other types of mechanical fasteners adds complexity, cost and weight. Unfortunately, the one-component toughened epoxy structural adhesives are not always useful when joining different materials to each other. This is because different materials can vary significantly in how much they expand and contract with changes in temperature. They expand by different amounts during the bake curing step. If the parts are bonded together too rigidly, they cannot "move" relative to each other to alleviate the stresses caused by the uneven expansion (and the subsequent uneven contraction that occurs when the assembly is cooled), and the assembly may either become permanently distorted or the adhesive bonds may fail. The one-component toughened epoxy adhesives, being rigid materials that have very low elongations at break (typically 10% or less) and high elastic moduli, cannot accommodate the uneven thermal expansion and contraction.

Polyurethane adhesives are easily formulated to have high elongations, and from that consideration would be excellent candidates for these applications. The shortcoming of polyurethane adhesives is their poorer thermal stability. Polyurethane adhesives degrade when subjected to the baking temperatures at which vehicular coatings are cured.

What is needed is an adhesive that has elongation and elastic modulus properties similar to those of polyurethane adhesives, but is in addition thermally stable at the temperatures typically encountered in curing automotive bake coatings. The adhesive should adhere strongly to a variety of substrates and exhibit high impact peel resistance.

This invention is in one aspect a one-component, epoxy-modified polyurethane and/or urea adhesive comprising in admixture:

at least one of components A and B, wherein component A) is one or more non-rubber-modified epoxy resins and component B) is one or more rubber-modified epoxy resins;
C) one or more reactive urethane group- and/or urea group-containing tougheners having a number average molecular weight of up to 35,000, at least one polyether or diene rubber segment having a weight of at least 1000 atomic mass units, and capped isocyanate groups of which at least 75% are monophenol- or polyphenol-capped isocyanate groups;
D) optionally, one or more core-shell rubbers;
E) one or more latent epoxy curing agents; and
F) at least one catalyst for the reaction of an epoxide with the curing agent(s); wherein
1) component A constitutes 0 to 40 percent of the combined weight of components A-E;
2) component B constitutes 0 to 40 percent of the combined weight of components A-E;
3) components A and B together constitute 12 to 40 percent of the combined weight of components A-E;
4) component C constitutes 55 to 85 percent of the combined weight of components A-E;
5) components B, C and D together constitute 65 to 97 percent of the combined weight of components A-E;
6) component D constitutes 0 to 15 percent of the combined weight of components A-E; and
7) components A-E together constitute at least 60 weight percent of the one-component epoxy adhesive.

When cured, this adhesive has a particularly desirable combination of properties. Its elongation to break (as measured according to DIN EN ISO 527-1) is typically greater than 80%, and can be as much as 300% or even more. In specific embodiments, the elongation to break is at least 100% or at least 140%, to as much as 250% or to as much as 225%. The elastic modulus of the cured adhesive can be as low as 1 MPa or as high as 100 MPa, with more typical values ranging from 5 to 50 MPa, and in specific embodiments can be within the range of 10 to 40 MPa. Elastic modulus is measured according to DIN EN ISO 527-1.

These high elongations and low elastic moduli are characteristic of polyurethane adhesives, but are very unusual for structural epoxy adhesives that are used in automotive body and/or frame assemblies. The very high proportion of the toughener is believed to contribute to the high elasticity of the materials. Very surprisingly, the cured adhesive exhibits very good thermal stability, despite the high proportion of materials containing urethane and urea groups.

In addition, the adhesive bonds strongly to a number of substrates, and exhibits lap shear strength and impact peel resistance very similar to those of many conventional structural toughened epoxy adhesives.

This invention is in another aspect a method for bonding two substrates, comprising forming a layer of the adhesive of the first aspect at a bondline between two substrates to form an assembly, and then curing adhesive layer at the bondline by heating to a temperature of at least 160° C. to form a cured adhesive bonded to the two substrates at the bondline. In some embodiments, the substrates have coefficients of linear thermal expansion that are different from each other by at least $5 \times 10^{-6}$ m/m-K.

In another aspect, the invention is a method for forming a bonded and coated assembly, comprising 1) forming a layer of the adhesive of the invention at a bondline between a first and a second substrate to form an assembly that includes the first and second substrates each in contact with the adhesive composition at the bondline; then 2) immersing the assembly into a coating bath to form a layer of an uncured coating on at least a portion of the exposed surface of the assembly; and 3) heating the degreased assembly to a temperature of at least 160° C. to cure the adhesive to form a cured adhesive bonded to the substrates at the bondline and simultaneously cure the coating layer.

The adhesive contains at least one non-rubber-modified epoxy resin, by which it is meant that, prior to curing, the epoxy resin is not chemically bonded to a rubber as described below.

A wide range of epoxy resins can be used as a non-rubber-modified epoxy resin, including those described at column 2 line 66 to column 4 line 24 of U.S. Pat. No. 4,734,332, incorporated herein by reference. The epoxy resin should have an average of at least 1.8, preferably at least 2.0, epoxide groups per molecule. The epoxy equivalent weight may be, for example, 75 to 350, preferably 140 to 250 and in some embodiments 150 to 225. If a mixture of non-rubber-modified epoxy resins is present, the mixture should have an average epoxy functionality of at least 1.8, preferably at least 2.0, and an epoxy equivalent weight as in the previous sentence, and more preferably each epoxy resin in the mixture has such an epoxy functionality and epoxy equivalent weight.

Suitable non-rubber-modified epoxy resins include diglycidyl ethers of polyhydric phenol compounds such as resorcinol, catechol, hydroquinone, biphenol, bisphenol A, bisphenol AP (1,1-bis(4-hydroxylphenyl)-1-phenyl ethane), bisphenol F, bisphenol K and tetramethylbiphenol; diglycidyl ethers of aliphatic glycols such as the diglycidyl ethers of $C_{2-24}$ alkylene glycols; polyglycidyl ethers of phenol-formaldehyde novolac resins (epoxy novolac resins), alkyl substituted phenol-formaldehyde resins, phenol-hydroxybenzaldehyde resins, cresol-hydroxybenzaldehyde resins, dicyclopentadiene-phenol resins and dicyclopentadiene-substituted phenol resins; and any combination of any two or more thereof.

Suitable epoxy resins include diglycidyl ethers of bisphenol A resins such as are sold by Olin Corporation under the designations D.E.R.® 330, D.E.R.® 331, D.E.R.® 332, D.E.R.® 383, D.E.R. 661 and D.E.R.® 662 resins.

Epoxy novolac resins can be used. Such resins are available commercially as D.E.N.® 354, D.E.N.® 431, D.E.N.® 438 and D.E.N.® 439 from Olin Corporation.

Other suitable non-rubber-modified epoxy resins are cycloaliphatic epoxides. A cycloaliphatic epoxide includes a saturated carbon ring having an epoxy oxygen bonded to two vicinal atoms in the carbon ring, as illustrated by the following structure III:

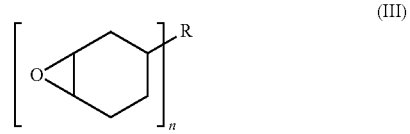

wherein R is an aliphatic, cycloaliphatic and/or aromatic group and n is a number from 1 to 10, preferably from 2 to 4. When n is 1, the cycloaliphatic epoxide is a monoepoxide. Di- or polyepoxides are formed when n is 2 or more. Mixtures of mono-, di- and/or polyepoxides can be used. Cycloaliphatic epoxy resins as described in U.S. Pat. No. 3,686,359, incorporated herein by reference, may be used in the present invention. Cycloaliphatic epoxy resins of particular interest are (3,4-epoxycyclohexyl-methyl)-3,4-epoxy-cyclohexane carboxylate, bis-(3,4-epoxycyclohexyl) adipate, vinylcyclohexene monoxide and mixtures thereof.

Other suitable epoxy resins include oxazolidone-containing compounds as described in U.S. Pat. No. 5,112,932. In addition, an advanced epoxy-isocyanate copolymer such as those sold commercially as D.E.R. 592 and D.E.R. 6508 (Dow Chemical) can be used.

The non-rubber-modified epoxy resin preferably is a bisphenol-type epoxy resin or mixture thereof with up to 10 percent by weight of another type of non-rubber-modified epoxy resin. The most preferred epoxy resins are bisphenol-A based epoxy resins and bisphenol-F based epoxy resins. These can have average epoxy equivalent weights of from about 170 to 600 or more, preferably from 225 to 400.

A rubber-modified epoxy resin for purposes of this invention is a compound having at least two epoxide groups separated by an aliphatic chain of at least 300 g/mol, preferably at least 500 g/mol. The aliphatic chain may be, for example, an alkylene group; an alkenyl group; a diene polymer or copolymer; or a polyether such as a poly(propylene oxide), a poly(ethylene oxide) or a copolymer of propylene oxide and ethylene oxide. The rubber-modified epoxy resin may have, prior to curing, a glass transition temperature of −20° C. or lower, preferably −30° C. or lower.

One useful type of rubber-modified epoxy resin is an epoxy-terminated polyether, which contains one or more polyether segments that each has a weight of at least 300 g/mol, preferably at least 500 g/mol. The polyether segment(s) each may have a weight of up to 10,000, up to 3,000 or up to 2,000 g/mol. One type of useful epoxy-terminated polyether is a diglycidyl ether of a polyether diol. The polyether diol may be, for example, a poly(propylene oxide), a poly(ethylene oxide), or a propylene oxide/ethylene oxide copolymer. Commercially available epoxy-terminated polyethers that are useful include those sold as D.E.R.® 732 and D.E.R.® 736 by Olin Corporation.

A second useful type of rubber-modified epoxy resin is a reaction product of any of the non-rubber-modified epoxy resins described before with at least one liquid rubber that has epoxide-reactive groups, such as amino or preferably carboxyl groups. The resulting adduct has reactive epoxide groups which allow the adduct to react further when the structural adhesive is cured. It is preferred that at least a portion of the liquid rubber has a glass transition temperature ($T_g$) of −40° C. or lower, especially −50° C. or lower, as measured by differential scanning calorimetry (DSC). Preferably, each of the rubbers (when more than one is used) has a glass transition temperature of −25° C. or lower. The rubber $T_g$ may be as low as −100° C. or even lower.

An example of this second type of rubber-modified epoxy resin is a reaction product of an amine-terminated polyether and an excess of a polyepoxide. The polyepoxide caps the amino groups of the amine-terminated polyether and forms free epoxide groups on the reaction product. The amine-terminated polyether preferably has 2 or 3 amino groups per molecule, prior to reaction with the polyepoxide. The amine-terminated polyether may have a weight of at least 300 g/mol, preferably at least 500 g/mol, up to 10,000, up to 3,000 or up to 2,000 g/mol. The polyepoxide may be any of the non-rubber modified epoxy resins mentioned above, among which the glycidyl ethers of polyphenols are preferred.

The second type of rubber-modified epoxy resin may be a reaction product of an excess of a polyepoxide with a homopolymer or copolymer of a conjugated diene, especially a diene/nitrile copolymer. The conjugated diene is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized nitrile monomer. The rubber preferably contains from about 1.5, more preferably from about 1.8, to about 2.5, more preferably to about 2.2, of epoxide-reactive terminal groups per molecule, on average. Carboxyl-terminated rubbers are preferred. The molecular weight ($M_n$) of the rubber (prior to reaction with the polyepoxide) is suitably from about 2000 to about 6000, more preferably from about 3000 to about 5000.

Suitable carboxyl-functional butadiene and butadiene/acrylonitrile rubbers are commercially available from Noveon under the tradenames Hycar® 2000X162 carboxyl-terminated butadiene homopolymer, Hycar® 1300X31, Hycar® 1300X8, Hycar® 1300X13, Hycar® 1300X9 and Hycar® 1300X18 carboxyl-terminated butadiene/acrylonitrile copolymers. A suitable amine-terminated butadiene/acrylonitrile copolymer is sold under the tradename Hycar® 1300X21.

Other rubber-modified epoxy resins include epoxidized fatty acids (which may be dimerized or oligomerized), and elastomeric polyesters that are modified to contain epoxy groups.

Component C of the adhesive is one or more reactive urethane group- and/or urea group-containing tougheners having a number average molecular weight of up to 35,000, at least one polyether or diene rubber segment having a weight of at least 1000 atomic mass units, and phenol- or polyphenol-capped isocyanate groups.

The toughener is conveniently made in a process that includes the steps of forming an isocyanate-terminated polyether or diene rubber, and capping the isocyanate groups with a phenol or polyphenol. The isocyanate-terminated polyether or diene rubber is conveniently made by reacting a hydroxyl- or amine-terminated polyether or hydroxyl- or amine-terminated diene rubber with an excess of a polyisocyanate, to produce adducts that have urethane or urea groups and terminal isocyanate groups. If desired, the isocyanate-terminated polyether or diene rubber can be chain-extended and/or branched prior to performing the capping reaction.

The polyether portion of the isocyanate-terminated polyether may be a polymer or copolymer of one or more of tetrahydrofuran (tetramethylene oxide), 1,2-butylene oxide, 2,3-butylene oxide, 1,2-propylene oxide and ethylene oxide, with polymers or copolymers of at least 70 weight-%, based on the total weight of the polymer or copolymer, of tetrahydrofuran, 1,2-butylene oxide, 2,3-butylene oxide and 1,2-propylene oxide being preferred. Polymers of at least 80 weight-% tetrahydrofuran, based on the total weight of the polymer or copolymer, are especially preferred.

The isocyanate-terminated polyether is conveniently prepared by the reaction of a hydroxyl- and/or amine-terminated polyether with a polyisocyanate, at a ratio of at least 1.5 equivalents, preferably 1.8 to 2.5 equivalents or 1.9 to 2.2 equivalents, of polyisocyanate per equivalent of hydroxyl and/or primary or secondary amino groups on the starting polyether. The starting polyether preferably has 2 to 3, more preferably 2, hydroxyl and/or primary or secondary amino groups per molecule. The polyisocyanate preferably has 2 isocyanate groups per molecule. The isocyanate-terminated polyether preferably has 2 to 3, more preferably 2, isocyanate groups per molecule. The starting polyether preferably has a number average molecular weight of 900 to 800, more preferably 1500 to 6000 or 1500 to 4000. The polyisocyanate preferably has a molecular weight of up to 300.

The isocyanate-terminated diene polymer is conveniently prepared by the reaction of a starting hydroxyl- or amine-terminated diene polymer with a polyisocyanate, at a ratio of at least 1.5 equivalents, preferably 1.8 to 2.5 equivalents or 1.9 to 2.2 equivalents, of polyisocyanate per equivalent of hydroxyl groups on the starting diene polymer.

The starting diene polymer preferably has a glass transition temperature, prior to reaction with the polyisocyanate, of no greater than −20° C. and preferably no greater than −40° C. The diene polymer is a liquid homopolymer or copolymer of a conjugated diene, especially a diene/nitrile copolymer. The conjugated diene is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized nitrile monomer.

The starting diene polymer preferably has 2 to 3, more preferably 2, hydroxyl and/or primary or secondary amino groups per molecule. The polyisocyanate preferably has 2 isocyanate groups per molecule. The isocyanate-terminated diene polymer preferably has 2 to 3, more preferably 2, isocyanate groups per molecule. The starting diene polymer preferably has a number average molecular weight of 900 to 800, more preferably 1500 to 6000 and still more preferably 2000 to 3000. The polyisocyanate preferably has a molecular weight of up to 300.

The isocyanate-terminated polyether and isocyanate-terminated diene polymer can have aromatic or aliphatic isocyanate groups. When the isocyanate-terminated polymers are made in the process described above, the polyisocyanate may be an aromatic polyisocyanate such toluene diamine or 2,4'- and/or 4,4'-diphenylmethane diamine, or an aliphatic polyisocyanate such as isophorone diisocyanate, 1,6-hexamethylene diisocyanate, hydrogenated toluene diisocyanate, hydrogenated methylene diphenylisocyanate ($H_{12}MDI$), and the like.

The reaction to form the isocyanate-terminated polymers can be performed by combining the starting polyether or diene rubber with the polyisocyanate and heating to 60 to 120° C., optionally in the presence of a catalyst for the reaction of isocyanate groups with the isocyanate-reactive groups of the polyether or diene polymer. The reaction is continued until the isocyanate content is reduced to a constant value, or to a target value, or until the amino- and or hydroxyl groups of the starting polyether or diene polymer are consumed.

If desired, branching can be performed by adding a branching agent into the reaction between the starting polyether or diene polymer and the polyisocyanate. The branching agent, for purposes of this invention, is a polyol or polyamine compound having a molecular weight of up to 599, preferably from 50 to 500, and at least three hydroxyl, primary amino and/or secondary amino groups per molecule. If used at all, branching agents generally constitute no more than 10%, preferably no more than 5% and still more preferably no more than 2% of the combined weight of the branching agent and the starting polyether or diene polymer. Examples of branching agents include polyols such as trimethylolpropane, glycerin, trimethylolethane, ethylene glycol, diethylene glycol, propylene glycol, dipropylene glycol, sucrose, sorbitol, pentaerythritol, triethanolamine, diethanolamine and the like, as well as alkoxylates thereof having a number average molecular weight of up to 599, especially up to 500.

Chain extension can be performed if desired by reacting the isocyanate-terminated polyether or diene polymer with a chain extender before performing the capping step. Chain extenders include polyol or polyamine compounds having a molecular weight of up to 749, preferably from 50 to 500, and two hydroxyl, primary amino and/or secondary amino groups per molecule. Examples of suitable chain extenders include aliphatic diols such as ethylene glycol, diethylene glycol, triethylene glycol, propylene glycol, dipropylene glycol, tripropylene glycol, 1,4-butanediol, 1,6-hexane diol, cyclohexanedimethanol and the like; aliphatic or aromatic diamines such as ethylene diamine, piperazine, aminoethylpiperazine, phenylene diamine, diethyltoluenediamine and the like, and compounds having two phenolic hydroxyl groups such resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A, and the like. Among these, the compounds having two phenolic hydroxyl groups are preferred.

The isocyanate groups of the isocyanate-terminated polyether or diene polymer are then capped by reaction with a capping agent. At least 90% of the isocyanate groups, more preferably at least 95% of the isocyanate groups, are capped with a monophenol or polyphenol. Examples of monophenols include phenol, alkyl phenols that contain one or more alkyl groups that each may contain from 1 to 30 carbon atoms, naphthol, a halogenated phenol, cardanol, or naphthol. Suitable polyphenols contain two or more, preferably two, phenolic hydroxyl groups per molecule and include resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A, as well as halogenated derivatives thereof. Up to 10%, preferably at most 5%, of the isocyanate groups may be capped with other capping agents such as amine, benzyl alcohol, hydroxy-functional acrylate or methacrylate compounds, thiol compounds, alkyl amide compounds having at least one amine hydrogen such as acetamide and ketoxime compounds.

The capping reaction can be performed under the general conditions described already, i.e., by combining the materials in the stated ratios and allowing them to react at room temperature or an elevated temperature such as 60 to 120° C., optionally in the presence of a catalyst for the reaction of isocyanate groups with the isocyanate-reactive groups of the capping agent. The reaction is continued until the isocyanate content is reduced to a constant value, which is preferably less than 0.1% by weight. Fewer than 3%, preferably fewer than 1%, of the isocyanate groups may remain uncapped.

The resulting toughener suitably has a number average molecular weight of at least 3000, preferably at least 4,000, to about 35,000, preferably to about 20,000 and more preferably to about 15,000, as measured by GPC, taking into account only those peaks that represent molecular weights of 1000 or more.

The polydispersity (ratio of weight average molecular weight to number average molecular weight) of the toughener is suitably from about 1 to about 4, preferably from about 1.5 to 2.5. The toughener suitably contains, on average, from about 1.5, preferably from about 2.0, to about 6, preferably to about 4, more preferably to about 3 and still more preferably to about 2.5, capped isocyanate groups per molecule. An especially preferred prepolymer contains an average of from 1.9 to 2.2 capped isocyanate groups per molecule.

The core-shell rubber is a particulate material having a rubbery core. The rubbery core preferably has a $T_g$ (by DSC) of less than −20° C., more preferably less than −50° C. and even more preferably less than −70° C. The $T_g$ of the rubbery core may be below −100° C. The core-shell rubber also has at least one shell portion that preferably has a $T_g$ of at least 50° C. The core of the core-shell rubber may be a polymer or copolymer of a conjugated diene such as butadiene, or a lower alkyl acrylate such as n-butyl-, ethyl-, isobutyl- or 2-ethylhexylacrylate, or may be a silicone rubber. The shell polymer, which is optionally chemically grafted or cross-linked to the rubber core, is preferably polymerized from at least one lower alkyl methacrylate such as methyl-, ethyl- or t-butyl methacrylate. Homopolymers of such methacrylate monomers can be used. Further, up to 40% by weight of the shell polymer preferably is formed from other monovinylidene monomers such as styrene, vinyl acetate, vinyl chloride, methyl acrylate, ethyl acrylate, butyl acrylate, and the like. The molecular weight of the grafted shell polymer may be, for example, between 20,000 and 500,000. The core-shell rubber may be provided in the form of a dispersion of the rubber particles in a carrier, such as an epoxy resin. Examples of useful core-shell rubbers include those described in EP 1 632 533 A1 and those sold by Kaneka Corporation under the designation Kaneka Kane Ace, including Kaneka Kane Ace MX 156 and Kaneka Kane Ace MX 120 core-shell rubber dispersions.

The adhesive also contains a latent curing agent. A curing agent is consider to be "latent" for purposes of this invention if the adhesive, including components A-F as set forth herein, exhibits a curing temperature of at least 100° C. or at least 140° C. The curing temperature may be as high as, for example, 180° C. The "curing temperature" refers to the lowest temperature at which the structural adhesive achieves at least 30% of its lap shear strength (DIN ISO 1465) at full cure within 2 hours. The lap shear strength at "full cure" is measured on a sample that has been cured for 30 minutes at 180° C., which conditions represent "full cure" conditions.

Suitable latent curing agents include materials such as boron trichloride/amine and boron trifluoride/amine complexes, melamine, diallylmelamine, guanamines such as dicyandiamide, methyl guanidine, dimethyl guanidine, trimethyl guanidine, tetramethyl guanidine, methylisobiguanidine, dimethylisobiguanidine, tetramethylisbiguandidine, heptamethylisobiguanidine, hexamethylisobiguanidine, acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. Dicyandiamide is a particularly preferred curing agent.

The catalyst for the reaction of the epoxy resin(s) with the curing agent is preferably encapsulated or otherwise a latent type which becomes active only upon exposure to elevated temperatures. Among preferred epoxy catalysts are ureas such as p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N',N'-dimethylurea (Chlortoluron), tert-acryl- or alkylene amines like benzyldimethylamine, 2,4,6-tris(dimethylaminomethyl)phenol, piperidine or derivatives thereof, various aliphatic urea compounds such as are described in EP 1 916 272; $C_1$-$C_{12}$ alkylene imidazole or N-arylimidazoles, such as 2-ethyl-2-methylimidazol, or N-butylimidazol and 6-caprolactam. 2,4,6-tris(dimethylaminomethyl)phenol integrated into a poly(p-vinylphenol) matrix (as described in European patent EP 0 197 892), or 2,4,6-tris(dimethylaminomethyl) phenol integrated into a novolac resin, including those described in U.S. Pat. No. 4,701,378, are suitable.

A preferred catalyst is an imidazoline catalyst having the structure:

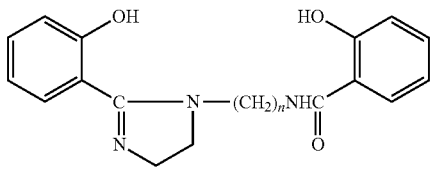

where n is 2 or 3, as described in U.S. Pat. No. 4,997,951. A specific example of such an imidazoline catalyst is 1-(2-(2-hydroxybenzamido)ethyl)-2-(2-hydroxyphenyl)-2-imidazoline. Such an imidazoline catalyst is sold commercially by Celerity LLC as Accelerine CEL 2191.

The non-rubber-modified epoxy resin(s) (component A) constitutes 0 to 40 percent of the combined weight of components A-E. Component A may constitute at least 10 percent or at least 15 percent of the combined weight of components A-E, and may constitute at most 30 percent, at most 25 percent or at most 22 percent of the combined weight of components A-E.

The rubber modified epoxy resin (component B) constitutes 0 to 40 percent of the combined weight of components A-E. If present at all, component B may constitute at least 2 percent or at least 5 percent of the combined weight of components A-E, and may constitute up to 20 percent, up to 15 percent or up to 12 percent of the combined weight of components A-E.

At least one of components A and B must be present in the adhesive. The combined weights of Components A and B constitute 12 to 40 percent of the combined weight of components A-E. In some embodiments, components A and B together constitute 15 to 35 or 20 to 30 percent of the combined weight of components A-E.

The toughener (component C) constitutes 55 to 85 percent of the combined weight of components A-E. In some embodiments, the toughener constitutes at least 60 or at least 65 percent of the combined weights of components A-E. The toughener may in some embodiments constitute up to 80, up to 75 or up to 70 percent of the combined weights of components A-E.

The combined weights of the rubber-modified epoxy resin (if present), the toughener and core-shell rubber (components B, C and D) together constitute 65 to 97 percent of the combined weight of components A-E. In specific embodiments, these components together may constitute 65 to 85, or 65 to 75 percent of the combined weights of components A-E.

The core-shell rubber (component D) constitutes 0 to 15 percent of the combined weight of components A-E, and in some embodiments constitutes 5 to 15 or 5 to 12 percent thereof. If the core-shell rubber is supplied as a dispersion in a liquid phase, only the weight of the rubber particles is counted toward the weight of the core-shell rubber component. If the core-shell rubber is provided as a dispersion in an epoxy resin, the weight of the epoxy resin in the dispersion is counted toward the weight of component A.

Components A-E together constitute at least 60 weight percent of the adhesive, and may constitute up to 100 weight percent thereof. In some embodiments, components A-E together constitute 60 to 90, 65 to 90, or 65 to 80 percent of the total weight of the adhesive.

The adhesive may in addition contain one or more optional ingredients.

The adhesive preferably contains one or more mineral fillers. These can perform several functions, such as (1) modifying the rheology of the adhesive in a desirable way, (2) reducing overall cost per unit weight, (3) absorbing moisture or oils from the adhesive or from a substrate to which it is applied, and/or (4) promoting cohesive, rather than adhesive, failure. Examples of suitable mineral fillers include calcium carbonate, calcium oxide, talc, carbon black, textile fibers, glass particles or fibers, aramid pulp, boron fibers, carbon fibers, mineral silicates, mica, powdered quartz, hydrated aluminum oxide, bentonite, wollastonite, kaolin, fumed silica, silica aerogel, polyurea compounds, polyamide compounds or metal powders such as aluminum powder or iron powder. Another filler of particular interest is a microballoon having an average particle size of up to 200 microns and density of up to 0.2 g/cc. The particle size is preferably about 25 to 150 microns and the density is preferably from about 0.05 to about 0.15 g/cc. Heat expandable microballoons which are suitable for reducing density include those commercially available from Dualite Corporation under the trade designation Dualite™, and those sold by Akzo Nobel under the trade designation Expancel™.

All or part of the mineral filler may be in the form of fibers having a diameter of 1 to 50 μm (D50, as measured by microscopy) and an aspect ratio of 6 to 20. The diameter of the fibers may be 2 to 20 μm or 2 to 10 μm, and the aspect ratio may be 8 to 20 or 8 to 16. The diameter of the fiber is taken as that of a circle having the same cross-sectional area as the fiber. The aspect ratio of the fibers may be 6 or more, such as 6 to 25, 6 to 20, 8 to 20 or 8 to 15.

Alternatively, all or part of the mineral filler may be in the form of low aspect ratio particles having an aspect ratio of 5 or less, especially 2 or less, and a longest dimension of up to 100 μm, preferably up to 25 μm.

The mineral filler(s) may constitute, for example, 1 to 40% of the total weight of the adhesive composition. In some embodiments, it constitutes at least 5%, at least 15 or at least 20% of the weight of the adhesive composition, and may constitute up to 35% of the weight thereof. If the mineral fillers include fumed silica, the adhesive may contain up to 10% by weight, preferably 1 to 6% by weight of fumed silica. Fumed silica may be present together with one or more other mineral fillers.

A monomeric or oligomeric, addition polymerizable, ethylenically unsaturated material is optionally present in the adhesive composition. This material should have a molecular weight of less than about 1500. This material may be, for example, an acrylate or methacrylate compound, an unsaturated polyester, a vinyl ester resin, or an epoxy adduct of an unsaturated polyester resin. A free radical initiator can be included in the adhesive composition as well, in order to provide a source of free radicals to polymerize this material. The inclusion of an ethylenically unsaturated material of this type provides the possibility of effecting a partial cure of the adhesive through selective polymerization of the ethylenic unsaturation.

The adhesive composition can further contain other additives such as dimerized fatty acids, diluents, plasticizers, extenders, pigments and dyes, fire-retarding agents, thixotropic agents, expanding agents, flow control agents, adhesion promoters and antioxidants. Suitable expanding agents include both physical and chemical type agents. The adhesive may also contain a thermoplastic powder such as polyvinylbutyral or a polyester polyol, as described in WO 2005/118734.

The foregoing adhesive composition is formed into a layer at a bondline between two substrates to form an assembly, and the adhesive layer is cured at the bondline to form a cured adhesive bonded to each of the two substrates.

The adhesive can be applied to the substrates by any convenient technique. It can be applied cold or be applied warm if desired. It can be applied manually and/or robotically, using for example, a caulking gun, other extrusion apparatus, or jet spraying methods. Once the adhesive composition is applied to the surface of at least one of the substrates, the substrates are contacted such that the adhesive is located at a bondline between the substrates.

After application, the adhesive is cured by heating it to at or above its curing temperature. Although lower temperatures can be used in some instances, particularly when longer curing times can be tolerated, it is generally preferable to perform the curing step by heating the adhesive to at least 160° C. The heating temperature may be as high as 220° C. or more, but is more preferably up to 210° C. The ability of an adhesive that contains such a high proportion of polyurethanes and/or polyureas to withstand such high curing temperatures while maintaining good adhesive and mechanical properties is quite surprising.

The adhesive of the invention can be used to bond a variety of substrates together including wood, metal, coated metal, aluminum, a variety of plastic and filled plastic substrates, fiberglass and the like. In one preferred embodiment, the adhesive is used to bond parts of automobiles together or to bond automotive parts onto automobiles. Such parts can be steel, coated steel, galvanized steel, aluminum, coated aluminum, plastic and filled plastic substrates.

Because of the high elongation of the cured adhesive, it is particularly useful in bonding different substrates together. The different substrates may have coefficients of linear thermal expansion (CLTEs) that are different from each other by at least $5\times10^{-6}$ m/m-K, at least $10\times10^{-6}$ m/m-K or at least $20\times10^{-6}$ m/m-K, as measured by ASTM E831. Examples of substrate pairings include pairings of different metals such as steel and aluminum; steel and magnesium; and aluminum and magnesium; pairings of a metal such as steel, magnesium, aluminum or titanium with a polymeric material such as thermoplastic organic polymer or a thermoset organic polymer; and pairing of a metal such as steel aluminum, magnesium or titanium and a fiber composite such as a carbon-fiber composite or a glass fiber composite. Substrates having significantly different CLTEs often exhibit greatly different amounts of expansion and contraction during the curing step and when the bonded assembly is cooled after curing. This problem is especially significant when the curing is performed at very high temperatures such as 160° C. or more. The high elongation of the cured adhesive of the invention can accommodate these rather large differences in expansion and contraction between the different substrates, which reduces adhesive failure and distortion.

An application of particular interest is bonding of automotive or other vehicular frame components to each other or to other components. The components to be bonded may include unlike materials that have differing CLTEs as described before.

Assembled automotive and other vehicular frame members often are coated with a coating material that requires a bake cure. The coating is typically baked at temperatures that may range from 160° C. to as much as 210° C. In such cases, it is often convenient to apply the adhesive to the frame components, then apply the coating, and cure the adhesive at the same time the coating is baked and cured. Between the steps of applying the adhesive and applying the coating, the assembly may be fastened together to maintain the substrates and adhesive in a fixed position relative to each other until the curing step is performed. Mechanical means can be used as a fastening device. These include, for example, temporary mechanical means such as various types of clamps, bands and the like, which can be removed once the curing step is completed. The mechanical fastening means can be permanent, such as, for example, various types of welds, rivets, screws, and/or crimping methods. Alternatively or in addition, the fastening can be done by spot-curing one or more specific portions of the adhesive composition to form one or more localized adhesive bonds between the substrates while leaving the remainder of the adhesive uncured until a final curing step is performed after the coating is applied.

The following examples are provided to illustrate the invention but are not intended to limit the scope thereof. All parts and percentages are by weight unless otherwise indicated. All molecular weights are number averages unless otherwise indicated.

In the following examples:

NRM (Non-Rubber-Modified) Epoxy Resin A is a liquid diglycidyl ether of bisphenol A having an epoxy equivalent weight of about 187.

RM (Rubber-Modified) Epoxy Resin A is an epichlorohydrin-capped poly(propylene oxide) diol having an epoxy equivalent weight of about 320. It contains a polyether segment of about 500-520 number average molecular weight.

RM Epoxy Resin B is a reaction product of a 2000 molecular weight aminated poly(propylene oxide) and a diglycidyl ether of bisphenol A.

The Core-Shell Rubber is a dispersion of about 33% core-shell rubber particles in 67% of a non-rubber-modified epoxy resin.

The Polyester is a hydroxy-functional, crystalline copolyester marketed as Dynacoll™ 7330 by Evonik Corporation.

Toughener A is a urethane group-containing elastomeric toughener containing bisphenol-blocked isocyanate groups.

It is prepared using general methods as described, for example, in Example 19 of U.S. Pat. No. 5,278,257, by reacting a 2000 molecular weight polytetrahydrofuran with isophorone diisocyanate to form a urethane group-containing, isocyanate-terminated prepolymer, and then capping the isocyanate groups with bisphenol A. Its number average molecular weight is less than 35,000.

The Mineral Fillers are a mixture of fumed silica, calcium oxide, calcium carbonate, wollastonite, talc and glass beads.

Examples 1-5 and Comparative Samples A and B

One-component adhesive Examples 1-5 and Comparative Samples A and B are prepared by mixing ingredients as indicated in Table 1:

TABLE 1

| Ingredient | Comp. A* | Ex. 1 | Ex. 2 | Ex. 3 | Ex. 4 | Comp. B | Ex. 5 |
|---|---|---|---|---|---|---|---|
| | Parts By Weight | | | | | | |
| NRM Epoxy A | 11.8 | 24.0 | 14.0 | 9.0 | 19.0 | 14.2 | 14.2 |
| RM Epoxy A | 5.0 | 0 | 0 | 0 | 0 | 0 | 0 |
| RM Epoxy B | 18.7 | 0 | 0 | 0 | 0 | 0 | 0 |
| Core-Shell Rubber | 9.8 | 0 | 0 | 0 | 0 | 0 | 0 |
| Polyester | 3.0 | 0 | 0 | 0 | 0 | 0 | 0 |
| Toughener A | 0 | 40 | 50 | 55.2 | 45 | 0 | 0 |
| Toughener B | 0 | 0 | 0 | 0 | 0 | 0 | 49.8 |
| Toughener C | 13.0 | 0 | 0 | 0 | 0 | 49.8 | 0 |
| Adhesion Promoter | 0.1 | 0.5 | 0.5 | 0.5 | 0.5 | 0.5 | 0.5 |
| Colorant | 0.7 | 0.4 | 0.4 | 0.4 | 0.4 | 0.4 | 0.4 |
| Catalyst A | 1.0 | 0.8 | 0.8 | 0.8 | 0.8 | 0.8 | 0.8 |
| Curing Agent | 3.4 | 2.3 | 2.3 | 0.9 | 1.4 | 1.4 | 1.4 |
| Mineral Fillers | 33.5 | 32.0 | 32.0 | 33.1 | 33.0 | 33.0 | 33.0 |
| Weight, Components A-E | 64.5 | 66.3 | 66.3 | 65.2 | 65.3 | 65.3 | 65.3 |
| % Component A, based on Components A-E | 28.1 | 36.2 | 21.1 | 13.8 | 29.1 | 21.7 | 21.7 |
| % Components A and B, based on Components A-E | 64.9 | 36.2 | 21.1 | 13.8 | 29.1 | 21.7 | 21.7 |
| % Tougheners, based on Components A-E | 20.1 | 60.3 | 75.4 | 84.5 | 68.9 | 76.2 | 76.2 |
| % Tougheners, rubber-modified epoxy resins and core-shell rubber particles, based on Components A-E | 62.4 | 60.3 | 75.4 | 84.5 | 68.9 | 76.2 | 76.2 |

*Not an example of this invention

Toughener B is a urethane group-containing elastomeric toughener containing o,o'-diallylbisphenol A-blocked isocyanate groups. It is prepared using general methods as described, for example, in Example 19 of U.S. Pat. No. 5,278,257 and US 2012-091842A, by reacting a 2000 molecular weight polytetrahydrofuran with isophorone diisocyanate to form a urethane group-containing, isocyanate-terminated prepolymer, and then capping the isocyanate groups with o,o'-diallylbisphenol A. Its number average molecular weight is less than 35,000.

Toughener C is a urethane group-containing elastomeric toughener containing amine-blocked isocyanate groups. It is prepared using methods such as described, for example, in Example 2 of US 2006-0276601, by reacting a 2000 molecular weight polytetrahydrofuran with isophorone diisocyanate to form a urethane group-containing, isocyanate-terminated prepolymer, and then capping the isocyanate groups with diisopropanolamine. Its number average molecular weight is less than 35,000.

Catalyst A is 2,4,6-tris(dimethylaminomethyl)phenol integrated into a poly(p-vinyl phenol) matrix.

Catalyst B is 1-(2-(2-hydroxybenzamido)ethyl)-2-(2-hydroxyphenyl)-2-imidazoline.

The Curing Agent is Amicure CG 1200G dicyandiamide, from Air Products.

The Adhesion Promoter is commercially available as RAM 1087 from Huntsman Corporation.

The Colorant is commercially available as Araldit DW yellow 0132 from Huntsman Corporation.

Comparative Sample A is a conventional toughened epoxy adhesive. The tougheners constitute about 20% of the weight of the reactive components (A-E). Further flexibilizing is provided by the presence of large amounts of rubber-modified epoxy resins and the core-shell rubber. Examples 1-5 are inventive compositions, in which the only flexibilizer present is the urethane group-containing toughener that has bisphenol-blocked isocyanate groups. In Comparative Sample B, the toughener has amine-blocked isocyanate groups.

Test samples for tensile strength, elongation and elastic modulus measurements are made by curing a portion of each sample for 30 minutes at 180° C. Test specimens are cut from the cured samples and evaluated according to DIN EN ISO 527-1.

Impact peel testing is performed as follows. The test coupons for the impact peel testing are 90 mm×20 mm with a bonded area of 30×20 mm. The adhesive sample is applied to the bond area of a 1.2 mm-thick HC400 high carbon steel coupon. A 1.2 mm-thick HC 400 steel coupon is placed into contact with the adhesive, and the assembly squeezed under a weight of about 10 kg to prepare each test specimen, with spacers present to maintain an adhesive layer thickness of 0.2 mm. The assembled test specimens are cured at 180° C. for 30 minutes. The impact peel testing is performed in accordance with the ISO 11343 wedge impact method. Testing is performed under a 90 Joule impact load at an operating speed of 2 m/sec with samples at a temperature of 23° C. or at −40° C., as indicated in Table 2.

Lap shear specimens are made using a DX56D low carbon steel coupon and a D100 galvanized steel coupon. The specimens are made by sprinkling glass beads (0.2 mm diameter) onto one of the coupons, applying the adhesive sample, and then positioning the second coupon on top of the adhesive. The bonded area in each case is 25×10 mm, and the adhesive layer thickness is controlled by the glass beads to 0.2 mm. The test specimens are cured for 30 minutes at 180° C. and evaluated for lap shear strength in accordance with DIN ISO 1465. Testing is performed at 23° C. and a test speed of 10 mm/minute.

Elastic modulus, tensile strength and elongation at break are evaluated by forming plaques from each adhesive sample, curing the plaques at 180° C. for 30 minutes, and performing the testing on room temperature test samples cut from the cured plaques according to DIN EN ISO 527-1.

Results of the testing are as indicated in Table 2.

TABLE 2

| Test | Comp. A* | Ex. 1 | Ex. 2 | Ex. 3 | Ex. 4 | Comp. B* | Ex. 5 |
|---|---|---|---|---|---|---|---|
| Impact Peel Str., 23° C., N/mm | 35.2 | 33.2 | 55.9 | 29.6 | 36.3 | 22.8 | 33.7 |
| Impact Peel Str., −40° C., N/mm | 15.5 | 18.0 | 29.5 | ND | ND | ND | ND |
| Lap Shear Str., MPa | ND | 16.0 | ND | 8.9 | 12.2 | 8.2 | 10.6 |
| Elastic Modulus, MPa | 251 | 231 | 13.6 | 1 | 23 | ** | 12 |
| Tensile Str., MPa | 14.7 | 11.6 | 7.1 | 3.8 | 8.6 | ** | 8.1 |
| Elongation, % | 20 | 80 | 146 | 287 | 144 | ** | 216 |

*Not an example of this invention.
ND means not determined.
** - sample could not be tested due to extensive bubble formation during cure.

Comparative Sample A has an elongation of only 20%, despite the presence of more than 62% by weight of various flexibilizing materials (based on the reactive materials). In Example 1, elongation is quadrupled to 80% despite a small decrease in the total amount of flexibilizing materials, by increasing the amount of toughener to about 60% by weight of reactive materials. Examples 2-5 show that even greater elongations are achieved when the amount of phenol-capped toughener is increased further. Very surprisingly, Examples 1-5 exhibit at most a small loss in impact peel strength, compared to Comparative Sample A, and in the case of Example 2 actually shows a significant improvement. The good impact peel strengths indicate that Examples 1-5 are very resistant to thermal degradation, despite the large fraction of material that contains urethane groups.

Comparative Sample B shows the effect of replacing a phenol-capped toughener with an amine-capped one in the high toughener formulations. Bubble formation occurs during plaque formation to the extent that meaningful mechanical properties cannot be measured. Thermal degradation is also evidenced by the impact peel and lap shear results—the lower values for Comparative Sample B are indicative of thermal degradation during the curing step.

Examples 6-10

One-component adhesive Examples 6-10 are prepared by mixing ingredients as indicated in Table 3:

TABLE 3

| | Parts By Weight | | | | |
|---|---|---|---|---|---|
| Ingredient | Ex. 6 | Ex. 7 | Ex. 8 | Ex. 9 | Ex. 10 |
| NRM Epoxy A | 0 | 14.2 | 12.4 | 12.2 | 14.2 |
| RM Epoxy A | 0 | 0 | 7.0 | 7.0 | 0 |
| RM Epoxy B | 24.0 | 0 | 0 | 0 | 0 |
| Toughener A | 40.0 | 49.8 | 46.0 | 46.0 | 49.8 |
| Toughener C | 0 | 0 | 3.0 | 3.0 | 0 |
| Adhesion Promoter | 0.5 | 0.5 | 0.6 | 0.6 | 0.5 |
| Colorant | 0.4 | 0.4 | 0.4 | 0.4 | 0.4 |
| Catalyst A | 0.8 | 0.8 | 0 | 0 | 0 |
| Catalyst B | 0 | 0 | 0.5 | 0.7 | 0.8 |
| Curing Agent | 2.3 | 1.4 | 1.6 | 1.6 | 1.4 |
| Mineral Fillers | 32.0 | 33.0 | 28.5 | 28.5 | 33.0 |
| Weight, Components A-E | 66.3 | 65.3 | 70.0 | 70.0 | 65.3 |
| % Component A, based on Components A-E | 0 | 21.7 | 17.7 | 17.4 | 21.7 |
| % Components A and B, based on Components A-E | 36.2 | 21.7 | 27.7 | 27.4 | 21.7 |
| % Tougheners, based on Components A-E | 60.7 | 76.3 | 65.7 | 65.7 | 76.3 |
| % Tougheners plus rubber-modified epoxy resins, based on Components A-E | 96.5 | 76.3 | 75.7 | 75.7 | 76.3 |

*Not an example of this invention.

Examples 6-10 are evaluated as in previous examples. In addition, Examples 8, 9 and 10 are also evaluated for lap shear strength after curing the test specimens at 170° C. and 205° C. Results are as in Table 4.

TABLE 4

| | Result | | | | |
|---|---|---|---|---|---|
| Test | Ex. 6 | Ex. 7 | Ex. 8 | Ex. 9 | Ex. 10 |
| Impact Peel Str., 23° C., N/mm | 57.7 | 39.2 | ND | ND | 41.3 |
| Impact Peel Str., −40° C., N/mm | 31.1 | ND | ND | ND | ND |
| Lap Shear Str., 170° C. Cure, MPa | ND | 9.8 | 11.1 | 11.0 | ND |
| Lap Shear Str., 180 C. Cure, MPa | ND | 10.9 | ND | ND | 12.9 |
| Lap Shear Str., 205° C. Cure, MPa | ND | 3.7 | 8.1 | 9.8 | ND |
| Elastic Modulus, MPa | 13.8 | 8 | ND | ND | 18 |
| Tensile Str., MPa | 6.6 | 6.5 | ND | ND | 10.1 |
| Elongation, % | 146 | 183 | >100% | >100 | 216 |

*Not an example of this invention.
ND means not determined.

All of Examples 6-10 exhibit excellent elongation and good thermal stability up to at least 180° C. curing temperatures. In Examples 8 and 9, this is achieved despite the presence of a small amount of amine-terminated toughener. Examples 8 and 9 further show the benefit of using the imidazoline catalyst when very high curing temperatures are used. With this catalyst, very little thermal degradation is seen even at the 205° C. curing temperature, as shown by comparing the lap shear strengths of the samples cured at 205° C. with those cured at lower temperatures.

Examples 11 and 12

One-component adhesive Examples 11 and 12 are prepared by mixing ingredients as indicated in Table 5:

TABLE 5

| Ingredient | Parts by Weight | |
| --- | --- | --- |
| | Ex. 11 | Ex. 12 |
| RM Epoxy B | 12 | 0 |
| Core-Shell Rubber | 12 | 24 |
| Toughener A | 40 | 40 |
| Adhesion Promoter | 0.5 | 0.5 |
| Colorant | 0.4 | 0.4 |
| Catalyst A | 0.8 | 0.8 |
| Curing Agent | 2.3 | 2.3 |
| Mineral Fillers | 32.0 | 32.0 |
| Weight, Components A-E | 66.3 | 66.3 |
| % Component A, based on Components A-E[1] | 12.1 | 24.1 |
| % Components A and B, based on Components A-E | 30.2 | 24.1 |
| % Tougheners, based on Components A-E | 60.3 | 60.3 |
| % Tougheners plus rubber-modified epoxy resins and core-shell rubber particles, based on Components A-E | 84.5 | 72.4 |

[1]Component A is supplied via the core-shell rubber dispersion, which contains 67% epoxy resin.

Examples 11 and 12 are evaluated as in previous examples. Results are as in Table 6.

TABLE 6

| Test | Results | |
| --- | --- | --- |
| | Ex. 11 | Ex. 12 |
| Impact Peel Str., 23° C., N/mm | 60.8 | 65.7 |
| Impact Peel Str., −40° C., N/mm | 1.0 | 66.1 |
| Lap Shear Str., 180° C. Cure, MPa | 9.5 | 9.2 |
| Elastic Modulus, MPa | 70 | 47 |
| Tensile Str., MPa | 8.2 | 9.8 |
| Elongation, % | 128 | 82 |

Example 12 compared to Example 11 shows that increasing concentration of core-shell rubber does not lead to improvements in elongation, and in fact causes a significant decrease in these tests. Each has excellent impact peel strength at 23° C. and very good lap shear strength, indicating that each resists thermal degradation at the 180° C. cure temperature. Example 11 also shows a higher elastic modulus despite its higher elongation.

What is claimed is:

1. A one-component epoxy-modified polyurethane and/or urea adhesive comprising in admixture:
    components A and B, wherein component A) is one or more non-rubber-modified epoxy resins and component B) is one or more rubber-modified epoxy resins;
    C) one or more reactive urethane group- and/or urea group-containing tougheners having a number average molecular weight of up to 35,000, at least one polyether or diene rubber segment having a weight of at least 1000 atomic mass units, and capped isocyanate groups of which at least 75% are monophenol- or polyphenol-capped isocyanate groups;
    D) optionally, one or more core-shell rubbers;
    E) one or more latent epoxy curing agents; and
    F) at least one catalyst for the reaction of an epoxide with the curing agent(s); wherein
    1) component A constitutes 10 to 25 percent of the combined weight of components A-E;
    2) component B constitutes 2 to 30 percent of the combined weight of components A-E;
    3) components A and B together constitute 12 to 40 percent of the combined weight of components A-E;
    4) component C constitutes 55 to 85 percent of the combined weight of components A-E;
    5) components B, C and D together constitute 65 to 85 percent of the combined weight of components A-E;
    6) component D constitutes 0 to 15 percent of the combined weight of components A-E; and
    7) components A-E together constitute at least 60 weight percent of the one-component epoxy adhesive.

2. The adhesive of claim 1, wherein component C constitutes 60 to 80 percent of the combined weight of components A-E.

3. The adhesive of claim 1, wherein component B includes at least one epoxy-terminated polyether.

4. The adhesive of claim 3 wherein component A includes at least one diglycidyl ether of a bisphenol.

5. The adhesive of claim 1, wherein the catalyst includes at least one imidazoline catalyst having the structure:

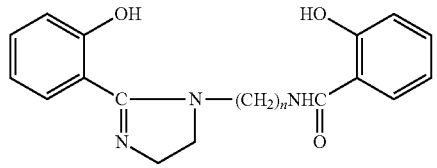

where n is 2 or 3.

6. A method for bonding two substrates, comprising forming a layer of the adhesive of claim 1 at a bondline between two substrates to form an assembly, and then curing adhesive layer at the bondline by heating to a temperature of at least 160° C., to form a cured adhesive bonded to the two substrates at the bondline.

7. The method of claim 6, wherein the two substrates have coefficients of linear thermal expansion that are different from each other by at least $5 \times 10^{-6}$ m/m-K.

8. The method of claim 7, wherein one of the substrates is a metal and the other substrate is a thermoplastic organic polymer, a thermoset organic polymer or a fiber composite.

9. A method for forming a bonded and coated assembly, comprising 1) forming a layer of the adhesive of claim 1 at a bondline between a first and a second substrate to form an assembly that includes the first and second substrates each in contact with the adhesive composition at the bondline; then
    2) immersing the assembly into a coating bath to form a layer of an uncured coating on at least a portion of the exposed surface of the assembly; and
    3) heating the assembly to a temperature of at least 160° C. to cure the adhesive to form a cured adhesive bonded to the substrates at the bondline and simultaneously cure the coating layer.

10. The method of claim 9, wherein the first and second substrates have coefficients of linear thermal expansion that are different from each other by at least $5 \times 10^{-6}$ m/m-K.

11. The method of claim 10, wherein one of the substrates is a metal and the other substrate is a thermoplastic organic polymer, a thermoset organic polymer or a fiber composite.

* * * * *